United States Patent
Creek

(10) Patent No.: US 6,896,623 B2
(45) Date of Patent: May 24, 2005

(54) AXIALLY COLLAPSIBLE PROPELLER SHAFT ASSEMBLY

(75) Inventor: Steve W. Creek, Shelby Twp., MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/465,190

(22) Filed: Jun. 19, 2003

(65) Prior Publication Data

US 2004/0259645 A1 Dec. 23, 2004

(51) Int. Cl.$^7$ .............................................. F16D 1/027
(52) U.S. Cl. ........................... 464/179; 464/183; 403/2
(58) Field of Search ..................... 464/32, 162, 179, 464/183; 74/492; 280/777; 403/2; 188/376

(56) References Cited

U.S. PATENT DOCUMENTS

| | | | |
|---|---|---|---|
| 3,504,567 A | * | 4/1970 | Ohashi et al. ................. 74/492 |
| 3,703,105 A | * | 11/1972 | Milton et al. .................. 74/492 |
| 4,791,269 A | * | 12/1988 | McLean et al. |
| 5,870,930 A | * | 2/1999 | Willett et al. .................. 74/492 |
| 5,984,354 A | * | 11/1999 | Kim ............................ 280/777 |
| 6,099,036 A | * | 8/2000 | Fujiu et al. ................... 280/777 |
| 6,193,612 B1 | * | 2/2001 | Craig et al. ................... 464/162 |
| 6,364,780 B1 | * | 4/2002 | Amborn et al. ......... 464/179 X |
| 6,666,772 B1 | * | 12/2003 | Cheney et al. .............. 464/183 |

OTHER PUBLICATIONS

Axial collapse tube of Visteon Corp, Dearborn, MI, used on Lincoln Mark VIII; product believed on the market about 1993.

Axial collapse tube of Visteon Corp, Dearborn, MI, used on Cougar/Thunderbird; product believed on the market about 1990.

Axial collapse tube of Visteon Corp, Dearborn, MI, used on Ford Explorer; product believed on the market about 2001.

* cited by examiner

*Primary Examiner*—Greg Binda
(74) *Attorney, Agent, or Firm*—Laura C. Hargitt

(57) ABSTRACT

An axially collapsible propeller shaft assembly, wherein the axial collapse feature resides in an axially collapsible drive connection between a stud shaft and a hollow propeller shaft, wherein under everyday drivingly conditions the drive connection provides torque transfer between the stud shaft and the propeller shaft, but under crash conditions the axial force telescopically receives the stud shaft into the hollow space of the propeller shaft. In a first embodiment, an end of the stud shaft is splinably engaged with an end cap affixed to the propeller shaft. In a second embodiment, a stud shaft is affixed to an end cap, which is, in turn, affixed to a propeller shaft. An annular score of the end cap has a bottom which is broken in a crash, which allows a central portion of the end cap to move with the stud shaft into the propeller shaft.

2 Claims, 2 Drawing Sheets

AXIALLY COLLAPSIBLE PROPELLER SHAFT ASSEMBLY

TECHNICAL FIELD

The present invention relates to automotive driveline components capable of axial collapse in the event of application of an axial force above a predetermined threshold value, such as would be encountered in the event of a crash, and more particularly to a telescopically collapsible propeller shaft assembly.

BACKGROUND OF THE INVENTION

Motor vehicle crash events are serious matters for the safety of occupants because of the large decelerations and forces that may act on occupants during the crash. To minimize the consequences to occupants in a crash, vehicles are engineered to keep the accelerations and forces experienced by occupants during a crash as low as possible. Seat belts and supplemental restraint systems (air bags) are some of the devices that are utilized. How the vehicle crushes and absorbs energy in a crash is another factor influencing the forces and accelerations to which occupants are subjected. For example, a vehicle has inherent crush or collapse characteristics of its various structural components which serve as crash energy management structures to dissipate energy in the event of a crash.

Driveline components are often required to incorporate a means of axial collapse and energy absorption during a crash event in which the driveline system is impacted by a high axial force. In order to maintain underbody vehicle integrity in such an incident, conventional means of handling this axial load is to design an axial collapsing feature in the propeller (drive) shaft. FIG. 1 depicts a portion of a conventional driveline 10 which includes a collapse feature 12 of a propeller shaft 14. The axial collapse feature 12 is in the form of a reduced diameter section 18 having a swage interface 16 with a large diameter section 20 of the propeller shaft 14, wherein the propeller shaft, including the reduced and large diameter sections, is in the form of a hollow tube. A stud shaft 22 from a housing (of the transmission, transfer case, constant velocity joint, etc.) 24 is connected, as for example by welding, to an end cap 26 of the propeller shaft 14. In the event of a crash, the propeller shaft 14 breaks at the swage interface 16, allowing the reduced diameter section 18 to slidingly telescope into the interior space of the large diameter section 20.

While a propeller shaft swage interface is the standard practice for providing a propeller shaft axial collapse function, it has several disadvantages, including swaging expense, increased propeller shaft assembly run-out, and underbody accommodation for two diameter sections of the propeller shaft. Accordingly, what remains needed in the art is a propeller shaft axial collapse capability which does not rely upon conventional swaging of the propeller shaft.

SUMMARY OF THE INVENTION

The present invention is an axially collapsible propeller shaft assembly, wherein the axial collapse feature resides in an axially collapsible drive connection between a stud shaft and a propeller shaft, wherein under everyday driving conditions the axially collapsible drive connection transfers torque from the stud shaft to the propeller shaft, but allows for the stud shaft to be telescopically received into the hollow space of the propeller shaft in the event of a crash.

According to a first preferred embodiment of the axially collapsible drive connection of the collapsible propeller shaft assembly according to the present invention, a hollow, preferably constant diameter, propeller shaft has an end cap connected thereto, as for example by welding. The end cap has a center aperture, wherein the sidewall of the aperture is splined. A stud shaft, preferably of solid construction, has a splined end and an opposite end drivingly connected to a drive component, as for example a transmission, transfer case, constant velocity joint, etc. The splines of the splined end of the stud shaft are gearingly meshed with the splines of the end cap. In this first embodiment, the axially collapsible drive connection provides a mechanically robust rotational drive interface between the stud shaft and the propeller shaft via the meshed splines, yet allows for telescoping in the event of a crash.

In the event of a crash involving axial loading on the driveline above a predetermined threshold, axial collapse of the driveline is provided by the stud shaft telescoping into the propeller shaft. During a crash, the end cap remains attached to the end of the propeller shaft, while the stud shaft is axially thrust into the hollow interior of the propeller shaft by an unsplined segment of the stud shaft distortingly ripping through the splines of the end cap, thereby absorbing crash energy as the driveline axially collapses.

According to a second preferred embodiment of the axially collapsible drive connection of the collapsible propeller shaft assembly according to the present invention, a stud shaft, having preferably solid construction, is fixedly connected to an end cap, as for example by welding. The opposite end of the stud shaft is drivingly connected to a drive component, as for example a transmission, transfer case, constant velocity joint, etc. The periphery of the end cap is attached to the end of a hollow, preferably constant diameter, propeller shaft. Adjacent the periphery, the end cap is provided with an annular score strategically machined thereinto. In this second embodiment, the axially collapsible drive connection provides sufficient mechanical strength of the end cap at the bottom of the score so that the stud shaft has a mechanically robust rotational drive interface with the propeller shaft, yet allows for telescoping in the event of a crash.

In the event of a crash involving axial loading on the driveline above a predetermined threshold, axial collapse of the driveline is provided by the end cap at the bottom of the score breaking adjacent the interior wall of the propeller shaft, allowing the stud shaft and the attached central portion of the end cap to telescope into the propeller shaft. In this regard, the stud shaft remains attached to the central portion of the end cap, and they are collectively thrust into the hollow interior of the propeller shaft. The score periphery of the central portion of the end cap scrapingly slides on the interior wall of the propeller shaft, thereby absorbing crash energy as the driveline collapses.

Accordingly, it is an object of the present invention to provide a collapsible shaft assembly which effects driveline collapse and crash energy management in the event an untoward crash event occurs.

This and additional objects, features and advantages of the present invention will become clearer from the following specification of a preferred embodiment.

DESCRIPTION OF THE PREFERRED EMBODIMENT

Figure 5:
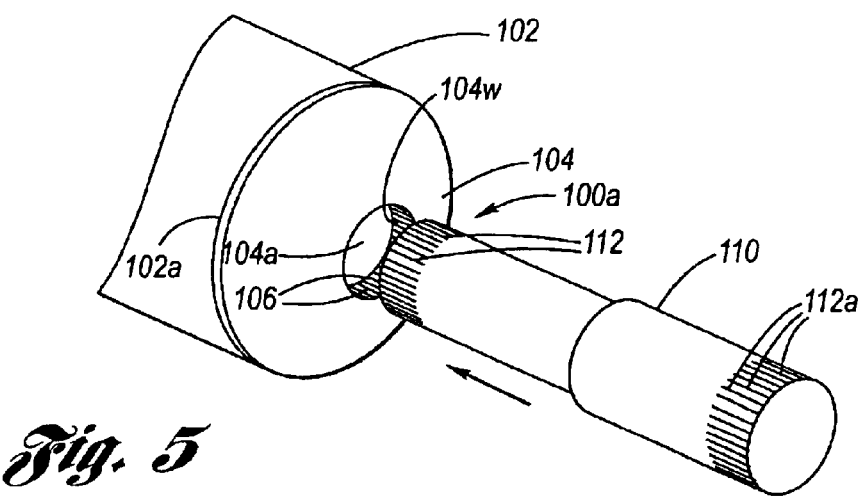
FIG. 5 is a perspective detail view of a stud shaft being splinably interfaced with an end cap according to the first embodiment of the present invention.
Figure 6:
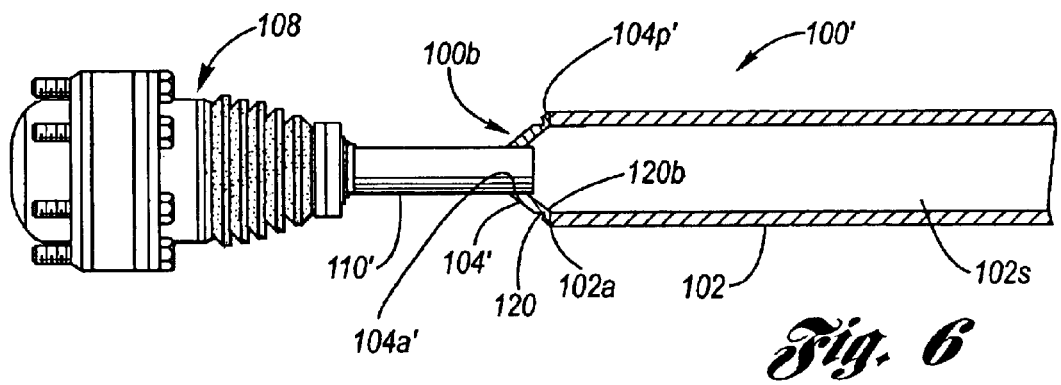
FIG. 6 is a partly sectional side view of the axially collapsible propeller shaft assembly according to a second embodiment of the present invention, shown in an uncollapsed state.

Referring now to the Drawing, FIGS. 2 through 8 depict the axially collapsible propeller shaft assembly according to the present invention 100, 100', wherein FIGS. 2 through 5 show a first preferred embodiment of an axially collapsible drive connection 100a of the collapsible propeller shaft assembly according to the present invention and FIGS. 6 though 8 show a second preferred embodiment of an axially collapsible drive connection 100b of the axially collapsible propeller shaft assembly according to the present invention.

The axially collapsible drive connection 100a, 100b of the axially collapsible propeller shaft assembly 100, 100' maintains shape, constant geometry, and torque transfer under expected operating conditions of the motor vehicle, but in the event of external application of an axial force above a predetermined threshold (ie., during a crash), the axially collapsible drive connection allows an axial collapsing movement in the driveline. The axially collapsible propeller shaft assembly 100, 100' is ideal in driveline configurations where the axle components are considered to be fixed to the motor vehicle underbody, as for example driveline configurations typical of most rear wheel drive car and unibody truck applications.

Turning attention now to FIGS. 2 through 5 the first preferred embodiment of the axially collapsible drive connection 100a of the axially collapsible propeller shaft assembly 100 will now be detailed.

Figure 1:
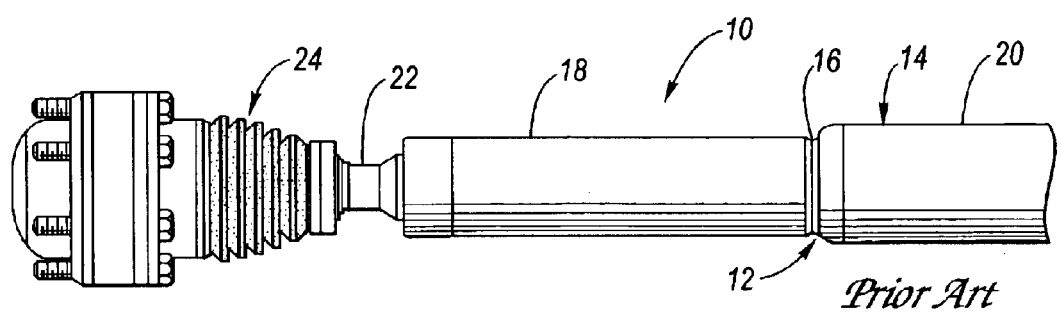
FIG. 1 is a side view of a prior art axially collapsible driveline which includes a swaged propeller shaft.
Figure 2:
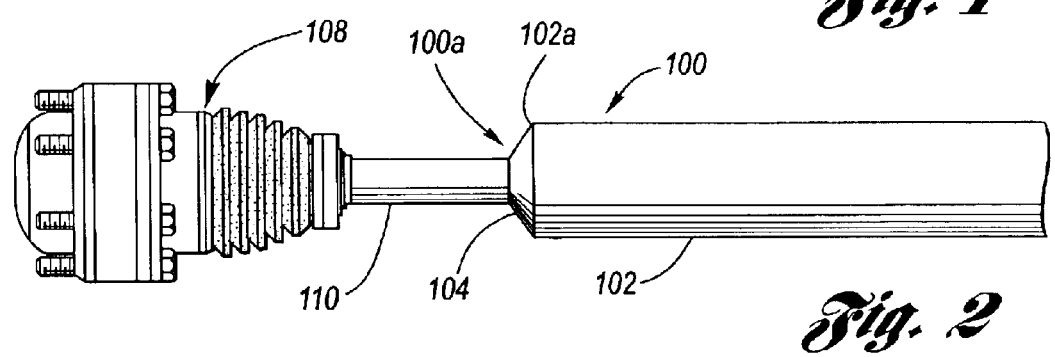
FIG. 2 is a side view of an axially collapsible propeller shaft assembly according to a first embodiment of the present invention.
Figure 3:
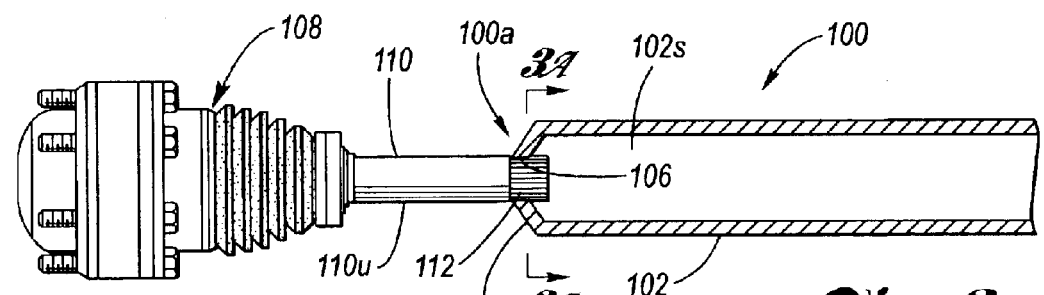
FIG. 3 is a partly sectional side view of the axially collapsible propeller shaft assembly according to the first embodiment, shown in an uncollapsed state.
Figure 3A:
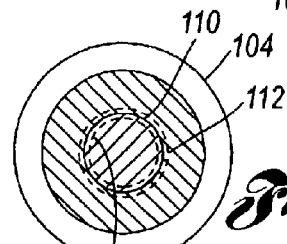
FIG. 3A is a partly sectional view, seen along line 3A—3A of FIG. 3.
Figure 4:
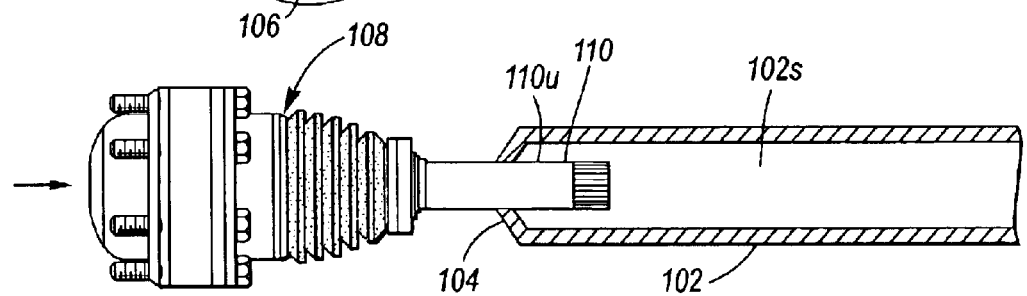
FIG. 4 is a partly sectional side view of the axially collapsible propeller shaft assembly, as in FIG. 3, now shown in a collapsed state.

As can be seen at FIGS. 2 and 3, a hollow tube propeller shaft 102 has an end cap 104 attached at an end 102a thereof, such as for example by welding. The propeller shaft 102 has, preferably, a constant diameter along its entire length. The end cap 104 has an aperture 104a defined by an aperture sidewall 104w. The aperture sidewall 104w has formed thereon axially aligned end cap splines 106 (see FIGS. 3 and 5). Emanating from a driveline component 108, such as for example the transmission, transfer case, constant velocity joint inner race, etc., is a stud shaft 110. The stud shaft 110 has axially aligned shaft splines 112 formed thereon at the free end 110a thereof, wherein the opposite end is drivingly engaged (as for example by second shaft splines 112a) with the driveline component 108. The shaft splines 112 are gearingly meshed with the end cap splines 106 such that rotation of the stud shaft 110 drivingly rotates the propeller shaft 102 whereby the torque is robustly transferred therebetween. The stud shaft 110 is elongated sufficiently to provide a predetermined amount of axial collapse into the propeller shaft 102, as will be detailed hereinbelow.

As can be understood by reference to FIG. 5, the end cap splines 106 of the end cap 104 can be gearingly meshed with the shaft splines 112 of the stud shaft 110 by a splined press-fit or by a splined connection that utilizes a snap ring. This axially collapsible drive connection 100a in which the splines 106, 112 are mutually meshed, will operate to transfer torque between the stud shaft 110 and the propeller shaft 102 under everyday driving conditions as a fixed assembly, providing adequate torque carrying ability for envisioned vehicle loading conditions.

In operation of the axially collapsible drive connection 100a, should an axial load above a predetermined threshold value be experienced by the driveline, the axial loading will cause the splined stud shaft 110 and the propeller shaft 102 to move axially with respect to each other by the stud shaft telescoping into the hollow interior space 102s of the propeller shaft. In this regard, as the stud shaft 110 axially telescopes into the propeller shaft 102, the unsplined segment 110u of the stud shaft distortingly rips through the end cap splines 106 of the end cap 104. This structural distortion serves to absorb crash energy as the driveline telescopically collapses. Thus, because to the ability of the driveline to axially collapse at the axially collapsible drive connection 100a, energy of the crash is absorbed, while at the same time underbody integrity of the motor vehicle is maintained.

Figure 7:
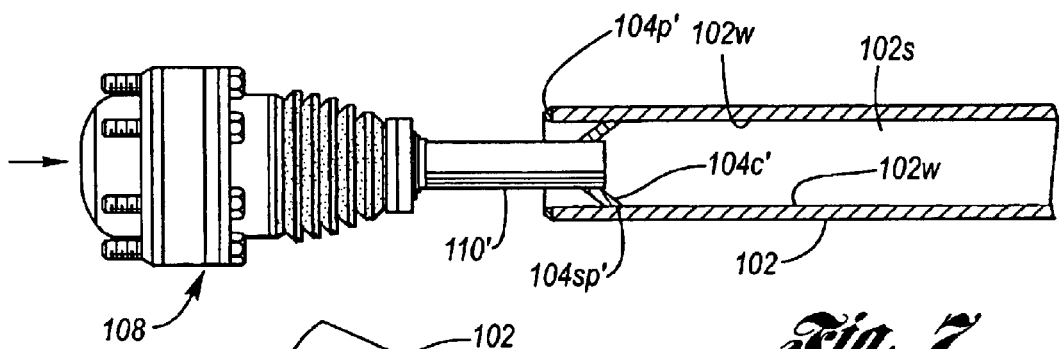
FIG. 7 is a partly sectional side view of the axially collapsible propeller shaft assembly, as in FIG. 6, now shown in a collapsed state.
Figure 8:
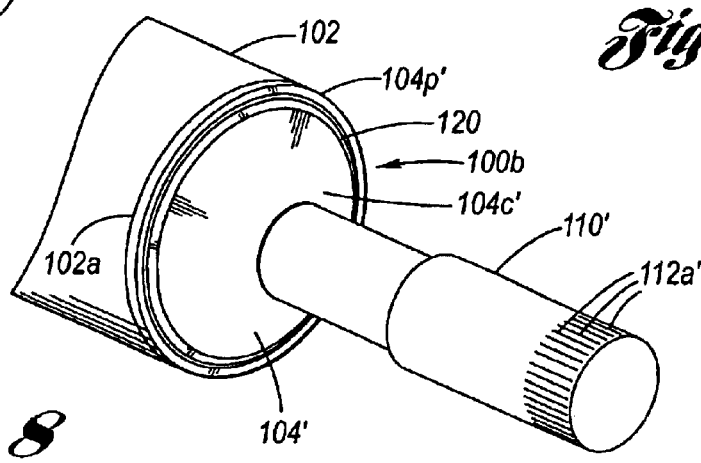
FIG. 8 is a perspective detail view of a stud shaft being interfaced with an end cap according to the second embodiment of the present invention.

Turning attention now to FIGS. 6 through 8 the second preferred embodiment axially collapsible drive connection 100b of the collapsible propeller shaft assembly 100' will now be detailed, wherein same parts as recounted above will have like numeral designations, and modified parts from those recounted above will be designated by like numerals with a prime.

As can be seen at FIG. 6, the periphery 104p' of an end cap 104' is attached to the end 102a of a hollow tube propeller shaft 102, such as for example by welding. The propeller shaft 102 has, preferably, a constant diameter along its entire length. Adjacent the periphery 104p', an annular score 120 is formed in the end cap 104', such as for example a V-shaped annular groove (see FIG. 8), which is strategically machined thereinto.

Emanating from a driveline component 108, such as for example the transmission, transfer case, constant velocity joint inner race, etc., is a stud shaft 110'. An end of the stud shaft 110' is received into the aperture 104a' of the end cap 104' and is affixed thereto, as for example by welding. The opposite end of the stud shaft is drivingly engaged (as for example by shaft splines 112a') with the driveline component 108.

The score 120 is cut with a predetermined depth such that the thickness of the score bottom 120b provides sufficient strength such that rotation of the stud shaft 110' drivingly rotates the propeller shaft 102 such that the torque is robustly transferred therebetween. This axially collapsible drive connection 100b, in which a score 120 provides a relatively thin walled score bottom 120b, allows transfer of torque between the stud shaft 110' and the propeller shaft 102 at the score bottom under everyday driving conditions as a fixed assembly, providing adequate torque carrying ability for envisioned vehicle loading conditions. The stud shaft 110' is elongated sufficiently to provide a predetermined amount of axial collapse into the propeller shaft 102, as will be detailed hereinbelow.

In operation of the axially collapsible drive connection 100*b*, should at least a predetermined level of axial load be experienced by the driveline, the axial loading will cause the stud shaft 110', which is preferably of solid construction, and the propeller shaft 102 to move axially with respect to each other. This movement is made possible because the end cap material at the score bottom 120*b* will break, allowing the central portion 104*c*' of the end cap 104', which remains attached to the end of the stud shaft 110', to move collectively with the stud shaft telescopically into the hollow interior space 102*s* of the propeller shaft 102. In this regard, the score 120 is strategically positioned so that the break in the end cap 104' creates a score periphery 104*sp*' which is, preferably, about the diameter of the interior wall 102*w* of the propeller shaft 102 such that as the telescoping ensues, the score periphery scrapes the interior wall. This scraping results in dissipation of crash energy while maintaining underbody integrity of the motor vehicle.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An axially collapsible shaft assembly, comprising:
   a first shaft having an end;
   a second shaft having an end, wherein said second shaft has a hollow interior space defined by an interior wall; and
   an axially collapsible drive connection between said first shaft and said second shaft, said axially collapsible drive connection transmitting torque between said first shaft and said second shaft, said axially collapsible drive connection comprising:
   an end cap fixedly attached to said end of said second shaft, said end cap having a periphery, an annular score being formed in said end cap adjacent said periphery, said score having a bottom; and
   said end of said first shaft being fixedly attached to said end cap;
   wherein said first shaft is axially movable with respect to said second shaft in response to a force above a predetermined threshold value being applied axially to said first shaft and said second shaft, wherein the force breaks said bottom of said score and thereby creates a score periphery of said end cap which permits said first shaft and a central portion of said end cap to be telescopically received into said interior space of said second shaft; and
   wherein during the axial movement of said first shaft with respect to said second shaft in which said first shaft is telescopically received into said second shaft, said score periphery of said end cap scrapes said interior wall of said second shaft, wherein the scraping dissipates enemy as said first shaft is telescopically received into said second shaft.

2. The axially collapsible shaft assembly of claim 1, wherein:
   said first shaft comprises a stud shaft having a solid construction; and
   said second shaft comprises a propeller shaft.

\* \* \* \* \*